(12) United States Patent
Joyce

(10) Patent No.: US 6,300,692 B1
(45) Date of Patent: Oct. 9, 2001

(54) LINEAR ACTUATOR WITH EXPANSION DEVICE

(75) Inventor: John Patrick Joyce, Grosse Pointe Park, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/538,367

(22) Filed: Mar. 29, 2000

(51) Int. Cl.[7] .......................... H01L 41/12; H01L 41/04; H01L 41/08; H02K 41/00; H02N 2/00
(52) U.S. Cl. ................................. 310/26; 310/12; 310/328
(58) Field of Search ................................. 310/26, 15, 12, 310/306, 328, 311

(56) References Cited

U.S. PATENT DOCUMENTS

| | | |
|---|---|---|
| 3,608,409 | 9/1971 | Schmidt . |
| 3,902,084 | 8/1975 | May, Jr. . |
| 3,902,085 | 8/1975 | Bizzigotti . |
| 3,952,215 | 4/1976 | Sakitani . |
| 4,347,452 | 8/1982 | Imahashi . |
| 4,757,223 | 7/1988 | Ueyama . |
| 4,777,398 | 10/1988 | Shibuya . |
| 5,013,945 | 5/1991 | Adolfsson . |
| 5,034,647 | 7/1991 | Ohtsuka . |
| 5,231,887 | * 8/1993 | Arvidsson et al. ..................... 74/88 |
| 5,281,875 | 1/1994 | Kiesewetter et al. . |
| 5,306,979 | 4/1994 | Schwartz, Jr. . |
| 5,317,223 | 5/1994 | Kiesewetter et al. . |
| 5,332,942 | 7/1994 | Rennex . |
| 5,406,153 | * 4/1995 | Flatau et al. .......................... 310/26 |
| 5,629,577 | 5/1997 | Polla et al. . |
| 5,662,020 | 9/1997 | Morita et al. . |
| 5,705,863 | 1/1998 | Teter . |
| 5,780,957 | 7/1998 | Oliver et al. . |

\* cited by examiner

Primary Examiner—Nestor Ramirez
Assistant Examiner—Guillermo Perez
(74) Attorney, Agent, or Firm—Gregory P. Brown

(57) ABSTRACT

A linear actuator includes a threaded support with first and second collars threadedly engaged with the support. First and second plates are abuttable against the first and second collars, respectively, and the first and second plates have a clearance fit with the respective first and second collars. An expansion device engages the first and second plates. A motor operatively engages the first collar for rotating the first collar. The first and second collars and expansion device are configured such that a load applied to the second plate is alternately supported by one of the first and second collars, depending upon the expansive condition of the expansion device, as the other of the first and second collars is rotated along the threaded support, thereby enabling the second plate to advance along the support against the load by expansion of the expansion device.

13 Claims, 1 Drawing Sheet

LINEAR ACTUATOR WITH EXPANSION DEVICE

TECHNICAL FIELD

The present invention relates to a linear actuator with an expansion device which includes first and second threaded collars which alternately support, a load depending upon the expansive condition of the expansion device, thereby enabling advancement of the load along a threaded support.

BACKGROUND OF THE INVENTION

Prior art devices designed to provide linear actuation using the expansion of material as a primary actuator are considerably complicated, expensive, and lack robustness.

One such linear actuator is described in U.S. Pat. No. 5,705,863, which teaches a linear actuator having a magnetostrictive rod which is magnetically energized under analog logic control in operative relation to a pair of electrically disengaged one-way locking devices, one of which is interconnected with the actuator through a stroke multiplier to provide a high force, high speed motor drive. Two-stage operation of the stroke multiplier is effected through levers angularly displaced by angular deformation of the magnetostrictive rod about a pivotal axis offset from the rod axis by means of a flexible support for such levers to avoid wear and backlash. This structure results in a complicated, expensive device.

Accordingly, it is desirable to provide a simple, inexpensive and robust linear actuator.

DISCLOSURE OF THE INVENTION

The present invention overcomes the above-referenced shortcomings of prior art linear actuators by providing a simple, inexpensive and robust linear actuator which takes advantage of new materials which can exert high forces, while having limited displacement, such as piezoelectrics, magnetorheologicals, and magnetostrictives, such as Terfenol. The device employs first and second collars threadedly engaged on a threaded support for alternately supporting a load depending upon the expansive condition of an expansion device. The first collar is rotatably driven by a drive motor.

More specifically, the present invention provides a linear actuator including a threaded support and first and second collars threadedly engaged with the threaded support. First and second plates are abuttable against the first and second collars, respectively, and the first and second plates have a clearance fit with the respective first and second collars. An expansion device engages the first and second plates. A motor operatively engages the first collar for rotating the first collar. The first and second collars and expansion device are configured such that a load applied to the second plate is alternately supported by one of the first and second collars, depending upon the expansive condition of the expansion device, as the other of the first and second collars is rotated along the threaded support, thereby enabling the second plate to advance along the support against the load by expansion of the expansion device.

Another aspect of the invention provides a method of linear actuation including the steps of: a) providing first and second collars threadedly engaged with a threaded support and including first and second plates abuttable against the first and second collars, respectively; b) rigidly supporting a load applied against the second plate on the second collar via its threaded engagement with the threaded support; c) rotatably advancing the first collar toward the first plate to contact and rigidly support the first plate; d) expanding an expansion device between the first and second plates to advance the second plate against the load while the first plate is rigidly supported by the first collar and its threaded engagement with the threaded support; e) rotatably advancing the second collar toward the advanced second plate to contact and rigidly support the second plate, thereby rigidly supporting the load; and f) contracting the expansion device and repeating steps (c)–(e) to advance the load along the threaded support.

Accordingly, an object of the present invention is to provide an improved linear actuator which employs an expansion device between first and second movable collars in a manner which is simple, inexpensive and robust.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
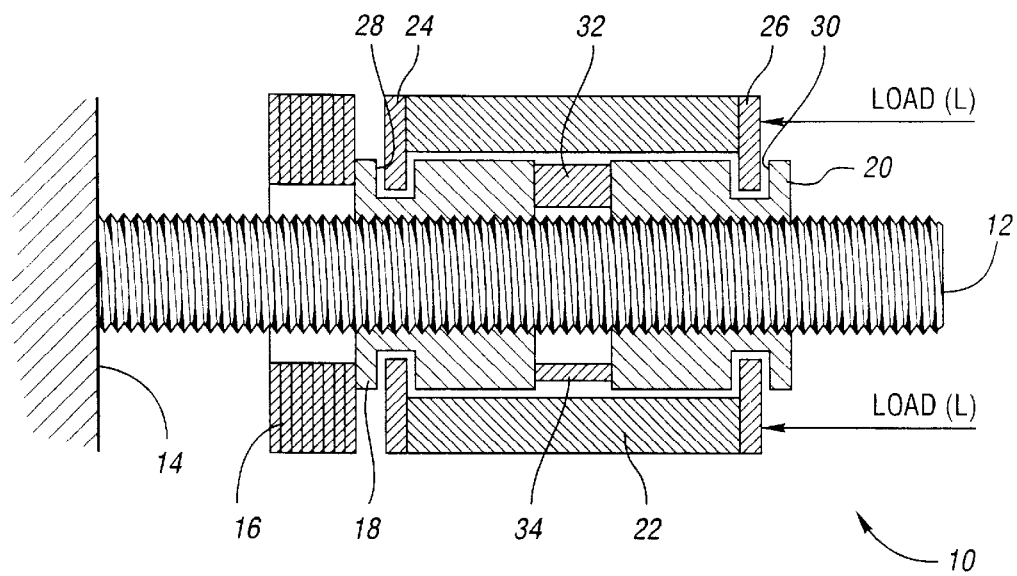
FIG. 1 shows a schematic longitudinal cross-sectional view of a linear actuator in accordance with a first embodiment of the invention.

Referring to FIG. 1, a schematic longitudinal cross-sectional view is shown of a linear actuator 10 in accordance with a first embodiment of the invention. As shown, a threaded support shaft 12 is fixed to a base 14. The actuator 10 includes a motor 16 which rotatably drives a first collar 18, which is threadedly engaged with the shaft 12. A second collar 20 is threadedly engaged with the shaft 12 at an advanced position along the shaft 12. An expansion device 22 is sandwiched between first and second plates 24,26. The first and second plates 24,26 are abuttable against opposing sides of cylindrical slots 28,30, which are formed in the first and second collars 18,20, respectively.

The expansion device 22 is preferably a piezoelectric, magnetorheological, or magnetostrictive component, such as Terfenol, which is available from Etrema Products, Inc. of Ames, Iowa. A torsional spring 32 connects the first and second collars 18,20 for reasons described below.

The expansion device 22 is expandable axially along the threaded shaft 12. The first and second plates 24,26 constrain movements of the collars 18,20 and the expansion device 22 so that all of the elements are allowed limited axial movement with respect to one another.

The first and second plates 24,26 may be incorporated as part of the expansion device 22, but are identified as separate components here. The plates 24,26 are provided with clearance with respect to the collars 18,20 in the cylindrical slots 28,30 such that some independent axial motion between them is possible.

The motor 16 is connected to the collar 18, but this motor has a much lower force capability than the expansion device 22. In general, the motor 16 is not expected to be able to induce linear motion to the load (L) shown when the highest forces are applied. The motor could be electric, hydraulic, pneumatic, etc., or could be replaced by a hand crank.

The function of the linear actuator 10 will now be described. When the expansion device 22 is deactivated (i.e. contracted to its shortest axial length), a load (L) applied to the second plate 26 causes it to bottom-out against the collar 20 at the left edge of the cylindrical slot 30, as viewed in FIG. 1. The load (L) transfers through the collar 20 to the threads on the threaded shaft 12. The collar 20 stays in position because in order to move axially it must rotate around the shaft 12, but its rotation around the shaft 12 is resisted by the friction of the threads on the shaft 12, as well as friction with the second plate 26.

The motor 16 is then activated, which causes the first collar 18 to rotate. As the first collar 18 rotates, it moves axially along the threaded shaft 12 until it has pressed the first plate 24 against the expansion device 22. As the collar 18 rotates, it also exerts a torque on the second collar 20 via the torsional spring 32, which is connected to the first and second collars 18,20. The second collar 20 does not rotate because of the friction forces described above. Once the first collar 18 has taken up the axial free play, the expansion device 22 is activated by a solenoid (in the preferred embodiment) which is integral therewith (not shown). In other embodiments, the expansion device may be hydraulic, activated by a pump or valve; magnetostrictive, activated by a magnetic field; piezoelectric, activated by an electric field; or magnetorheological, activated by heat.

As the expansion device 22 expands axially, it pushes the plates 24,26 away from each other. The second plate 26 is lifted off the collar, against the load (L). The first plate 24 is pressed into the collar 18, locking it into place, just as collar 20 had earlier been locked in place.

Now free of the load (L), the second collar 20 is then able to rotate under the torque exerted by the torsional spring 32. As the second collar 20 rotates, it moves axially and eliminates the axial clearance to the second plate 26. Once the clearance is eliminated, the expansion device 22 can be deactivated (contracted). The device is now in the same state as earlier, but has translated axially against the load (L). As the process is repeated, significant linear motion against high loads can be achieved.

The device functions exactly the same way when traveling in the opposite direction, except that the direction of rotation of the motor 16 is reversed.

An additional element, a coupler 34, is shown which may be added to assure operation. The function of the coupler 34 is to assure that the first and second collars 18,20 cannot travel too far axially away from each other. This can be done in any number of manners, including: limiting the rotation between the two collars 18,20; incorporating the plates 24,26 into the expansion device 22; or providing another device which couples the axial translation of the collars 18,20 together but allows independent travel over a limited distance. If the distance between the two collars becomes excessive, the expansion device 22 cannot relieve one collar of the load on it by transferring the load to the other collar. The device would then be frozen in position.

This invention contemplates numerous variations. For example, the collars 18,20 may be driven by independent motors. Stepper motors could be used to track the position of the load (L) and ensure that the collars 18,20 do not develop excessive axial distance between each other. Rotational counters and/or travel transducers may be attached to the collars 18,20 and/or the motor 16 to track their positions. The motor 16 may be used alone for some loading/control conditions.

Figure 2:
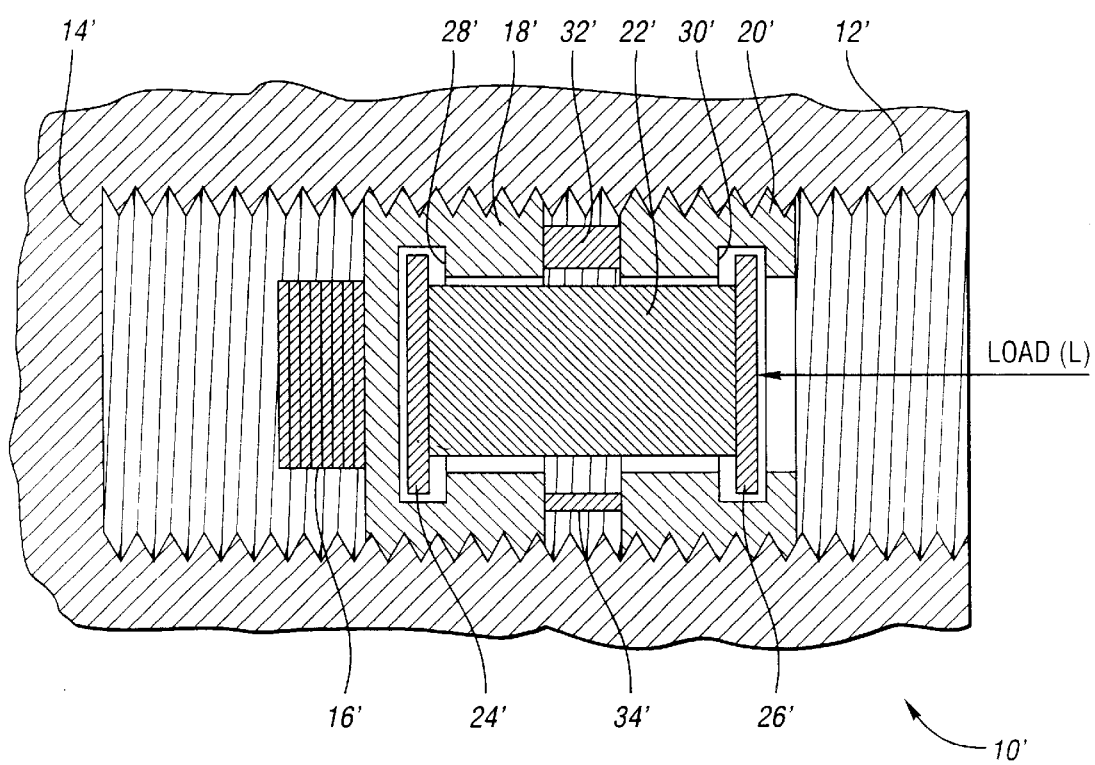
FIG. 2 shows a schematic longitudinal cross-sectional view of a linear actuator in accordance with a second embodiment of the invention.

The construction may be reflected in part or in whole across a radius (about the axis of the shaft) such that any of the following are true: the collars have male threads acting in a tube with female threads; the expansion device does not have a hole as seen from an axial view; or the plates are surrounded by the collars. FIG. 2 shows an embodiment in which all of these are true. In FIG. 2, like reference numerals are used to identify like components from FIG. 1, wherein a prime (') indicates the like components. As shown, the threaded support 12' is actually a threaded aperture formed in a support body 14', and the first and second collars 18', 20' are externally threaded for engagement with the threaded support 12'.

The construction could also be made such that the threaded shaft is separated into two pieces which are rotated while the collars are prevented from rotating. The motor would be connected to the threaded shaft with a spring between the shafts, or multiple motors on each shaft could be used. Such a construction would probably be less effective, because bearings would be needed to allow the shafts to turn while carrying the load and the motor would have to be larger.

The motor could be replaced with a conventional linear actuator. This configuration would require that the thread dimensions on the shaft were such that the mechanism would not bind. Friction between the plates and the collars must then play a greater role in preventing rotation of the collars, and thus axial movement. Similarly, the torsional spring connection could be replaced with a compression or tension spring.

Noise dampening materials could also be applied to some or all components to reduce noise. Also, compliant elements (springs, rubber, etc.) may be used in various areas, principally near the plates and the motor to reduce noise by maintaining continuous contact (although at reduced forces) with the moving elements. This may necessitate a larger motor. Dampening elements, such as fluids, may similarly be used.

The motor 16 (or motors if dedicated motors for each collar/shaft are used) can be switched on and off between the actuations of the expansion device 22, but can also be allowed to stall. If the motor is allowed to stall, the current draw will rise as the motor slows. This can serve as an indication that the axial play has been taken up and that the expansion device should be actuated.

As loads increase, it is expected that the mechanism will advance more slowly. Since the load of the motor after deactivation of the expansion device will always be similar, the motor should eliminate the axial clearance in shorter periods of time at higher loads. By measuring the duration of time between deactivations of the expansion device and the current rise in the motor, a value of the load can be estimated. Similarly, if the motor is turned off during expansion device actuations, the time between the start of the motor and the rise in current due to loading can be measured to estimate loads.

While the best modes for carrying out the invention have been described in detail, those familiar with the art to which this invention relates will recognize various alternative designs and embodiments for practicing the invention within the scope of the appended claims.

What is claimed is:

1. A linear actuator comprising:

a threaded support;

first and second collars threadedly engaged with the support;

first and second plates abuttable against the first and second collars, respectively, and said first and second plates having a clearance fit with the respective first and second collars;

an expansion device engaging the first and second plates;

a motor operatively engaged with the first collar for rotating the first collar;

wherein said first and second collars and said expansion device are configured such that a load applied to the second plate is alternately supported by one of the first and second collars, depending upon the expansive condition of the expansion device, as the other of the first and second collars is rotated along the threaded support, thereby enabling the second plate to advance along the support against the load by expansion of the expansion device.

2. The linear actuator of claim 1, further comprising a torsional spring connecting the first and second collars to automatically rotate the second collar when the expansion device expands and disengages the second plate from the second collar.

3. The linear actuator of claim 1, wherein said first and second collars include cylindrical slots formed therein to receive the first and second plates, respectively, said cylindrical slots being sufficiently wide to allow a predetermined amount of axial movement of the first and second plates with respect to the respective first and second collars before abutting against the respective collars.

4. The linear actuator of claim 1, wherein said threaded support comprises a threaded shaft.

5. The linear actuator of claim 4, wherein said threaded support comprises a threaded shaft.

6. The linear actuator of claim 1, wherein said threaded support comprises a threaded aperture formed in a support body.

7. The linear actuator of claim 1, further comprising a coupler connecting the first and second collars to limit axial separation thereof.

8. A method of linear actuation comprising:

a) providing first and second collars threadedly engaged with a threaded support and including first and second plates abuttable against the first and second collars, respectively;

b) rigidly supporting a load applied against the second plate on the second collar via its threaded engagement with the threaded support;

c) rotatably advancing the first collar toward the first plate to contact and rigidly support the first plate;

d) expanding an expansion device between the first and second plates to advance the second plate against the load while the first plate is rigidly supported by the first collar and its threaded engagement with the threaded support;

e) rotatably advancing the second collar toward the advanced second plate with an electric motor to contact and rigidly support the second plate, thereby rigidly supporting the load; and f) repeating steps (c)–(e) to advance the load along the threaded support.

9. The method of claim 8, further comprising contracting the expansion device between steps (e) and (f).

10. A linear actuator comprising:

a threaded support;

first and second collars threadedly engaged with the threaded support;

first and second plates abuttable against the first and second collars, respectively, and said first and second plates having a clearance fit with the respective first and second collars;

an expansion device engaging the first and second plates;

a motor operatively engaged with the first collar for rotating the first collar; and a torsional spring connecting the first and second collars to automatically rotate the second collar when the expansion device expands and disengages the second plate from the second collar;

wherein said first and second collars and said expansion device are configured such that a load applied to the second plate is alternately supported by one of the first and second collars, depending upon the expansive condition of the expansion device, as the other of the first and second collars is rotated along the threaded support, thereby enabling the second plate to advance along the support against the load by expansion of the expansion device.

11. The linear actuator of claim 10, wherein said first and second collars include cylindrical slots formed therein to receive the first and second plates, respectively, said cylindrical slots being sufficiently wide to allow a predetermined amount of axial movement of the first and second plates with respect to the respective first and second collars before abutting against the respective collars.

12. The linear actuator of claim 10, wherein said threaded support comprises a threaded aperture formed in a support body.

13. The linear actuator of claim 10, further comprising a coupler connecting the first and second collars to limit axial separation thereof.

* * * * *